United States Patent
Kim et al.

(10) Patent No.: US 12,523,788 B2
(45) Date of Patent: Jan. 13, 2026

(54) METHOD FOR ANALYZING ALPHA-RAY SPECTRUM OBTAINED FROM RADIATION SOURCE

(71) Applicant: KOREA INSTITUTE OF RADIOLOGICAL & MEDICAL SCIENCES, Seoul (KR)

(72) Inventors: Gun A Kim, Seoul (KR); Jong Guk Kim, Seongnam-si (KR); Il Han Lim, Seoul (KR); Byoung Soo Kim, Suwon-si (KR); Kang Hyon Song, Seoul (KR)

(73) Assignee: KOREA INSTITUTE OF RADIOLOGICAL & MEDICAL SCIENCES, Seoul (KR)

( * ) Notice: Subject to any disclaimer, the term of this patent is extended or adjusted under 35 U.S.C. 154(b) by 172 days.

(21) Appl. No.: 18/260,469

(22) PCT Filed: Dec. 9, 2021

(86) PCT No.: PCT/KR2021/018656
§ 371 (c)(1),
(2) Date: Jul. 5, 2023

(87) PCT Pub. No.: WO2022/164011
PCT Pub. Date: Aug. 4, 2022

(65) Prior Publication Data
US 2024/0053498 A1 Feb. 15, 2024

(30) Foreign Application Priority Data
Jan. 29, 2021 (KR) .................. 10-2021-0013059

(51) Int. Cl.
*G01T 1/36* (2006.01)
*G01T 1/167* (2006.01)

(52) U.S. Cl.
CPC .............. *G01T 1/36* (2013.01); *G01T 1/167* (2013.01)

(58) Field of Classification Search
CPC .......... G01T 1/36; G01T 1/167; G01T 1/202; G01N 23/207; G01N 23/2273; G01N 23/2076
See application file for complete search history.

(56) References Cited

U.S. PATENT DOCUMENTS

| | | | |
|---|---|---|---|
| 2007/0069147 A1 | 3/2007 | Ohtaka et al. | |
| 2013/0158888 A1 | 6/2013 | Jones | |
| 2020/0170597 A1* | 6/2020 | Hindorf | A61B 6/5205 |

FOREIGN PATENT DOCUMENTS

| | | |
|---|---|---|
| JP | H5-209965 A | 8/1993 |
| JP | H6-265639 A | 9/1994 |

(Continued)

*Primary Examiner* — David P Porta
*Assistant Examiner* — Gisselle M Gutierrez

(57) ABSTRACT

The present invention relates to a method for analyzing an alpha-ray spectrum obtained from a radiation source, wherein the radiation source includes a first nuclide and a second nuclide that are different from each other, the method comprising the steps of: obtaining simulated spectra for alpha rays emitted from the first nuclide and the second nuclide through a simulation using radioactivity functions of the first nuclide and the second nuclide; measuring alpha rays emitted from the radiation source to obtain an alpha-ray spectrum; and decomposing the alpha-ray spectrum into a first alpha-ray spectrum emitted from the first nuclide and a second alpha-ray spectrum emitted from the second nuclide, on the basis of the simulated spectra.

11 Claims, 15 Drawing Sheets

(56) References Cited

FOREIGN PATENT DOCUMENTS

| | | | | |
|---|---|---|---|---|
| JP | H8-136658 | A | 5/1996 | |
| JP | 2007-93471 | A | 4/2007 | |
| JP | 2011-177504 | A | 9/2011 | |
| JP | 2019-219340 | A | 12/2019 | |
| JP | 2020-528149 | A | 9/2020 | |
| JP | 7589363 | B2 * | 11/2024 | ............... G01T 1/36 |
| KR | 10-2013-0086815 | A | 8/2013 | |
| KR | 10-1975787 | B1 | 5/2019 | |
| KR | 102471133 | B1 * | 11/2022 | ............. G01T 11/36 |

* cited by examiner

FIG. 5

| Region | Material | Density(g/cm³) | Source activity(kBq) |
|---|---|---|---|
| 1 | Air | 1.293 × 10⁻³ | - |
| 2 | Kidney | 1.05 | ²²⁵Ac(2.5)+²¹³Bi(5.0) |
| 3 | Kidney | 1.05 | ²²⁵Ac(2.5) |
| 4 | Blood | 1.06 | ²¹³Bi(5.0) |
| 5 | Blood | 1.06 | ²²⁵Ac(5.0) |

FIG. 11

|        | $\hat{I}_r$ : Estimated activity(Relative error) ||
|--------|------------------|------------------|
| Region | $^{225}$Ac       | $^{213}$Bi       |
| 1      | -                | -                |
| 2      | 2.61 kBq (4.4%)  | 4.81 kBq (3.8%)  |
| 3      | 2.44 kBq (2.4%)  | < 0.01 kBq (-)   |
| 4      | < 0.01 kBq (-)   | 5.08 kBq (1.6%)  |
| 5      | 5.07 kBq (1.4%)  | 0.2 kBq (-)      |

METHOD FOR ANALYZING ALPHA-RAY SPECTRUM OBTAINED FROM RADIATION SOURCE

CROSS-REFERENCE TO RELATED APPLICATIONS

This application is the National Stage filing under 35 U.S.C. 371 of International Application No. PCT/KR2021/018656, filed on Dec. 9, 2021, which claims the benefit of KR Patent Application No. 10-2021-0013059 filed on Jan. 29, 2021, the contents of which are all hereby incorporated by reference herein in their entirety.

TECHNICAL FIELD

The present disclosure relates to a method of analyzing an alpha ray spectrum obtained from a radiation source.

BACKGROUND ART

Radiation therapy using nuclides that emit alpha rays (targeted alpha therapy: TAT) has recently attracted attention.

As for the TAT, when a corresponding nuclide (parent nuclide) decays to generate a daughter nuclide, the daughter nuclide also exists at the position to be treated.

A planned amount of daughter nuclides emitting alpha rays can maximize a therapeutic effect, but an excessive amount of daughter nuclides results in an increase in toxicity.

Therefore, it is necessary to determine whether a corresponding daughter nuclide has been generated by a parent nuclide at the position to be treated or has been introduced into the position by its physiological action after being generated by a parent nuclide at another position.

DISCLOSURE

Technical Problem

Accordingly, the purpose of the present disclosure is to provide a method of analyzing an alpha ray spectrum obtained from a radiation source.

Technical Solution

To achieve the aforementioned purpose of the present disclosure, a method of analyzing an alpha ray spectrum obtained from a radiation source, wherein the radiation source includes a first nuclide and a second nuclide that are different from each other, may involve: obtaining simulated spectra of alpha rays emitted from the first and second nuclides by a simulation based on radioactivity functions of the first and second nuclides; obtaining the alpha ray spectrum by measuring an alpha ray emitted from the radiation source; and decomposing the alpha ray spectrum into a first alpha ray spectrum for an alpha ray emitted from the first nuclide and a second alpha ray spectrum for an alpha ray emitted from the second nuclide based on the simulated spectra.

The second nuclide may be a daughter nuclide of the first nuclide.

The combination of the first nuclide and the second nuclide may be any one of the combinations of [$^{225}$Ac, $^{213}$Bi], [$^{211}$At, $^{212}$Po], [$^{212}$Bi, $^{212}$Po], [$^{213}$Bi, $^{213}$Po], [$^{212}$Pb, $^{212}$Po], [$^{223}$Ra, $^{212}$Bi], and [$^{227}$Th, $^{211}$Bi].

The radiation source may include a first radiation source and a second radiation source, and the first radiation source and the second radiation source may have different distributions of the first nuclide and the second nuclide.

In the measurement, the first radiation source and the second radiation source may be spaced apart from each other.

The method may further involve deriving, after the decomposition, a ratio of an alpha ray from the first radiation source and an alpha ray from the second radiation source at a specific position to be measured.

The measurement may be performed on a replica of a part of the body.

The radioactivity functions may be obtained based on information on the half-life and the probability of emission of the first nuclide and the second nuclide.

The decomposition of a spectrum to be measured may involve a step of obtaining a coefficient ratio between the first alpha ray spectrum and the second alpha ray spectrum at a specific position to be measured.

To achieve the aforementioned purpose of the present disclosure, a method of analyzing an alpha ray spectrum obtained from a radiation source, wherein the radiation source includes a first radiation source including a parent nuclide and a second radiation source that is spaced apart from the first radiation source and includes a daughter nuclide of the parent nuclide, may involve: obtaining simulated spectra of alpha rays emitted from the parent nuclide and the daughter nuclide by a simulation based on radioactivity functions of the parent nuclide and the daughter nuclide; obtaining the alpha ray spectrum by measuring an alpha ray emitted from the radiation source; decomposing the alpha ray spectrum into a first alpha ray spectrum for an alpha ray emitted from the parent nuclide and a second alpha ray spectrum for an alpha ray emitted from the daughter nuclide based on the simulated spectra; and classifying alpha rays measured at a specific position into an alpha ray from the parent nuclide and an alpha ray from the daughter nuclide.

The simulated spectra may be stored in the form of a library prior to the measurement, and, during the measurement, the step of decomposing the alpha ray spectrum may be performed using the simulated spectra in the form of a library, which has been already completed.

The measurement may be performed on a replica of a part of the body.

Advantageous Effects

The present disclosure provides a method of analyzing an alpha ray spectrum obtained from a radiation source.

DESCRIPTION OF DRAWINGS

FIGS. 4 and 5 show replicas of parts of the body and radiation sources used for the experimental example of the present disclosure.

FIG. 11 shows a comparison between the radioactivity of an actually injected nuclide and the radioactivity of an expected nuclide of the experimental example of the present disclosure.

MODE FOR DISCLOSURE

Hereinafter, the present disclosure will be described in more detail with reference to the appended drawings.

Because the accompanying drawings are only examples shown to describe the technology of the present disclosure more specifically, the technology of the present disclosure is not limited to that in the accompanying drawings. In addition, in the accompanying drawings, the size, the spacing, etc. of each component may be exaggerated in order to describe the relationship between the components.

In the following description, the distinction between a parent nuclide and a daughter nuclide in radiotherapy using an alpha-emitting nuclide is described as an example, but the present disclosure is not limited thereto. The present disclosure may be used for monitoring alpha-emitting nuclides required for the safety of nuclear power plants, controlling the quality in an alpha-emitting nuclide milking system (a system for generating radioactive isotopes by separating daughter nuclides from parent nuclides), etc.

Figure 1:
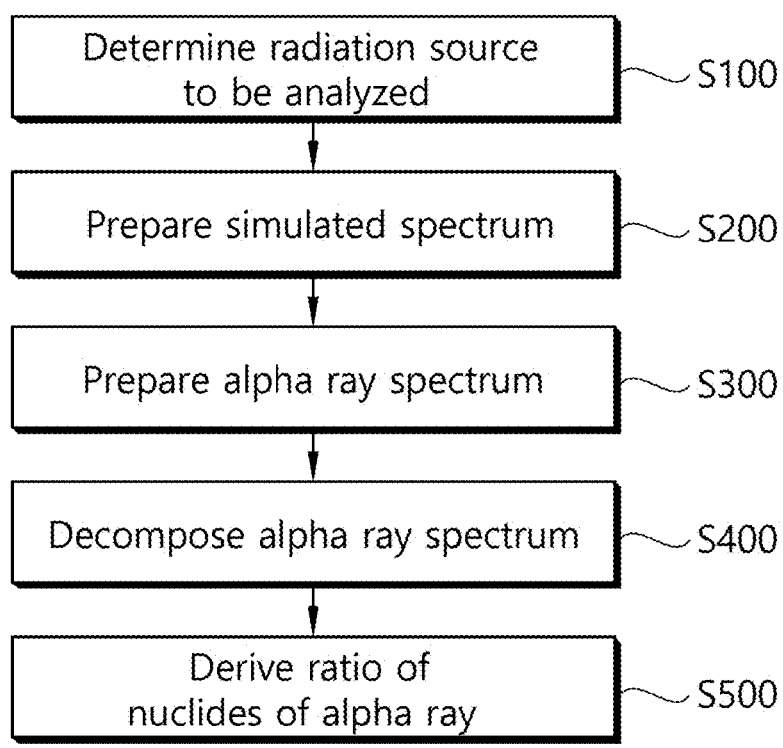
FIG. 1 is a flow chart of a method of analyzing an alpha ray spectrum according to an embodiment of the present disclosure.

A method of analyzing an alpha ray spectrum according to the present disclosure will be described with reference to FIG. 1.

First, a radiation source to be analyzed may be determined at S100.

The radiation source may include first and second nuclides.

The first and second nuclides may have a relationship between a parent nuclide and a daughter nuclide, but are not limited thereto. They may be selected from combinations of [$^{225}$Ac, $^{213}$Bi], [$^{211}$At, $^{212}$Po], [$^{212}$Bi, $^{212}$Po], [$^{213}$Bi, $^{213}$Po], [$^{212}$Pb, $^{212}$Po], [$^{223}$Ra, $^{212}$Bi], and [$^{227}$Th, $^{211}$Bi].

Next, a simulated spectrum may be obtained at S200.

The simulated spectrum may be obtained using radioactivity functions for the first and second nuclides. The radioactivity function may be obtained based on half-life information and emission information for each nuclide and may be obtained by inputting information into the Bateman equation of Equation 1 below, but is not limited thereto. The radioactivity function for the first nuclide may reflect information on the first nuclide and its daughter nuclide, and the radioactivity function for the second nuclide may reflect information on the second nuclide and its daughter nuclide.

$$\frac{dN_i(t)}{dt} = -\lambda_i N_i(t) + \lambda_{i-1} N_{i-1}(t) \quad <\text{Equation 1}>$$

$$N_n(t) = \lambda_1 \lambda_1 \ldots \lambda_{n-1} N_1(0) \sum_{i=1}^{n} C_i e^{-\lambda_i t}$$

-continued
$$C_i = \prod_{i=1}^{j=n} (\lambda_j - \lambda_i)^{-1} \text{ for } j \neq i,$$

wherein t denotes a specific time, $\lambda_i$ and $N_i$ respectively denote the decay constant and the amount of the i-th nuclide among nuclides on a decay curve of selected nuclides, and $N_n(t)$ denotes the amount of the n-th nuclide present at a specific time t.

Through a simulation using the obtained radioactivity functions, information on initial radioactivity of the first nuclide (e.g., 10 kBq), and information on initial radioactivity of the second nuclide (e.g., 10 kBq), simulated spectra (simulated energy spectra) for alpha rays emitted from the first and second nuclides may be obtained.

For the simulation, the Monte Carlo simulation using the Geant4 application for tomographic emission (GATE) code may be used, but it is not limited thereto. In other embodiments, other codes such as the FLUKA code, the MCNPX code, or the Geant4 code may be used.

In the simulation, coefficient information for each energy of the first and second nuclides may be obtained, and a simulated spectrum may be obtained from the obtained coefficient information for each energy.

Next, an alpha ray spectrum may be obtained by measuring an alpha ray emitted from a radiation source at S300.

In the measurement, the alpha ray spectrum may be obtained for each two-dimensional pixel by injecting a radiation source into a specimen and photographing it with an alpha ray imaging device.

The alpha ray imaging device may be prepared by combining a scintillator, an optical sensor, etc.

The specimen may be a replica of small animal slices or body parts. The replica may be a replica of an organ such as a kidney, but is not limited thereto.

In the measurement, a plurality of radiation sources spaced apart from each other may be provided, and the distribution of nuclides of each radiation source may be different. For example, a first radiation source may contain only the first nuclide while a second radiation source may contain only the second nuclide, or the first radiation source may contain the first nuclide and the second nuclide while the second radiation source may contain only the second nuclide. Alternatively, each of the first radiation source and the second radiation source may include both the first nuclide and the second nuclide, but the ratios of the first nuclide and the second nuclide of the first and second radiation sources may be different.

Then, the alpha ray spectrum may be decomposed at S400.

The alpha ray spectrum may be decomposed into a first alpha ray spectrum for an alpha ray emitted from the first nuclide and a second alpha ray spectrum for an alpha ray emitted from the second nuclide.

A detailed description of the decomposition process is as follows.

The decomposition process may be performed based on a simulated spectrum, and, specifically, may be carried out by a basis decomposition method.

An alpha ray spectrum ($b_{x, y}$) at the position of x and y may be decomposed by a coefficient ratio of a simulated spectrum (A) of the first nuclide and the second nuclide obtained from a simulated spectrum. For the decomposition process, the formula of Equation 2 below may be used, but it is not limited thereto.

$$w^*_{x,y} = \underset{w}{\operatorname{argmin}} \|Aw_{x,y} - b_{x,y}\|_2^2 \text{ s.t. } w_{x,y} \geq 0 \qquad <\text{Equation 2}>$$

When $^{225}$Ac of 10 kBq is used as the first nuclide and $^{213}$Bi of 10 kBq is used as the second nuclide, w x, y may be obtained as a result of inserting a photographed alpha ray spectrum ($b_{x,y}$) into the above-mentioned formula. That is, $w^*_{x,y}$ may be a coefficient when $b_{x,y}$ is expressed as A. For example, when A is [3,1] and the captured $b_{x,y}$ is 19, the formula may be to find $w^*_{x,y}$ with certain constraints, which satisfies $b_{x,y}$=w1*3+w2*1. When the answer is $w^*_{x,y}$=[5,4], $^{225}$Ac at a specific position of x and y may be 50 kBq, which is 5*10 kBq, and $^{213}$Bi at the position of x and y may be 40 kBq, which is 4*10 KBq.

In other words, the decomposition process may involve a step of obtaining a coefficient ratio between the first alpha ray spectrum and the second alpha ray spectrum at a specific position for the measurement.

Finally, the ratio between nuclides of an alpha ray may be derived at S500.

In this step, it may be determined whether an alpha ray at a specific position is emitted from the first nuclide or the second nuclide, and the ratio between the two nuclides may be derived. That is, a radiation source from which the alpha ray has been emitted may be determined.

The aforementioned $w^*_{x,y}$ may be obtained with two values of which one may be a coefficient ratio for the first alpha ray spectrum and the other one may be a coefficient ratio for the second alpha ray spectrum. As a result, the abundance ratio of the first nuclide and the second nuclide at a specific position of x and y may be known.

Because the process of determining the abundance ratio of the first and second nuclides may be performed over the entire two-dimensional (2D) area, it may be possible to obtain an image of the distribution of radioactivity for each nuclide. As a result, it may be possible to additionally display the first and second nuclides in different colors and fuse them to obtain a fusion image, which can be used to visualize the distribution of alpha rays for each nuclide.

In another embodiment, information on nuclides for each position may be provided without a separate imaging operation.

According to the present disclosure described above, it may be possible to determine a radiation source from which an alpha ray has been emitted even when measurement is carried out using equipment with a relatively low energy resolution.

Using the method according to the present disclosure, it may be possible to obtain an image of the distribution of nuclides for each nuclide in an imaging system.

In addition, by using a corresponding image of the distribution of nuclides in preclinical experiments for the TAT, it may be possible to trace the generation mechanism of daughter nuclides, prevent toxicity due to the excess amount of daughter nuclides, and maximize therapeutic effect.

The present disclosure will be described in detail through the following experimental example.

In the following experimental example, an alpha ray spectrum to be decomposed was obtained by simulation rather than actual measurement.

The nuclides in the experimental example are $^{225}$Ac as a parent nuclide and $^{213}$Bi as a daughter nuclide.

The decay curve of the $^{225}$Ac as the parent nuclide may be as follows.

Figure 2:
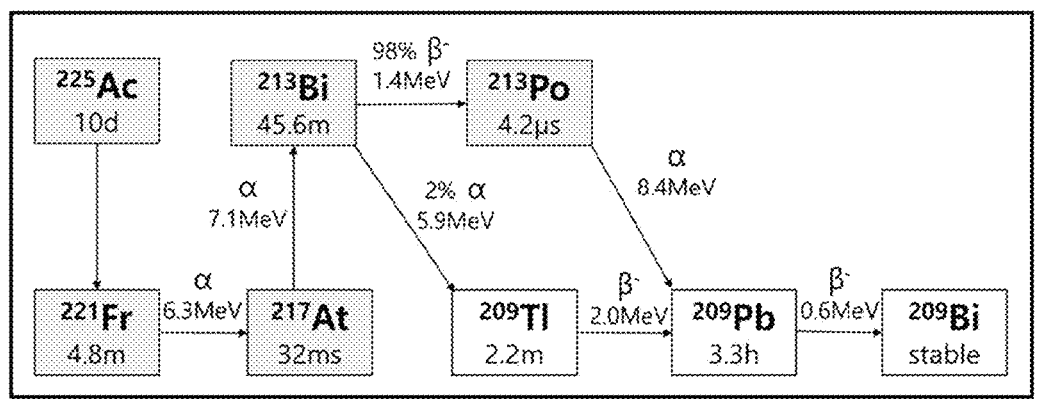
FIG. 2 shows decay curve of the $^{225}$Ac as the parent nuclide.

The simulated spectrum for the parent nuclide may include the energy spectrum emitted by the $^{225}$Ac and all daughter nuclides of the $^{225}$Ac, such as $^{221}$Fr and $^{213}$Bi, and the simulated spectrum for the daughter nuclide may include only the energy spectrum emitted by the $^{213}$Bi and all daughter nuclides of the $^{213}$Bi, such as $^{213}$Po and $^{209}$Tl. FIG. 2. shows general Ac-225 decay chain, which releases four alpha particles with energies of 5.8 MeV (Ac-225), 6.3 MeV (Fr-221), 7.1 MeV (At-217), and either 8.4 MeV (Po-213 via 98% pathway) or 5.9 MeV (Bi-213 via 2% pathway).

Figure 3:
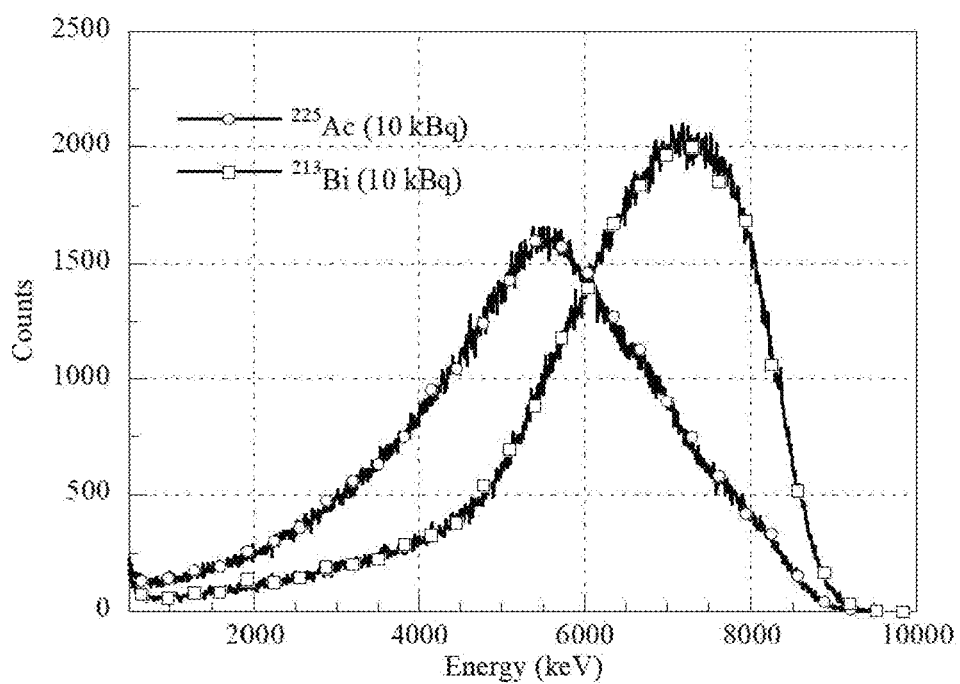
FIG. 3 shows simulated spectra obtained from the experimental example of the present disclosure.

As shown in FIG. 3, simulated spectra at a radioactivity of 10 kBq were obtained for both the $^{225}$Ac as the parent nuclide and the $^{213}$Bi as the daughter nuclide. FIG. 3 shows "A" in Equation 2 above.

The simulated spectra were obtained based on information on radioactivity of each nuclide obtained by time through the Bateman equation and the Monte Carlo simulation in which an alpha ray imaging device is applied to the Geant4 application for tomographic emission (GATE) code.

Figure 4:
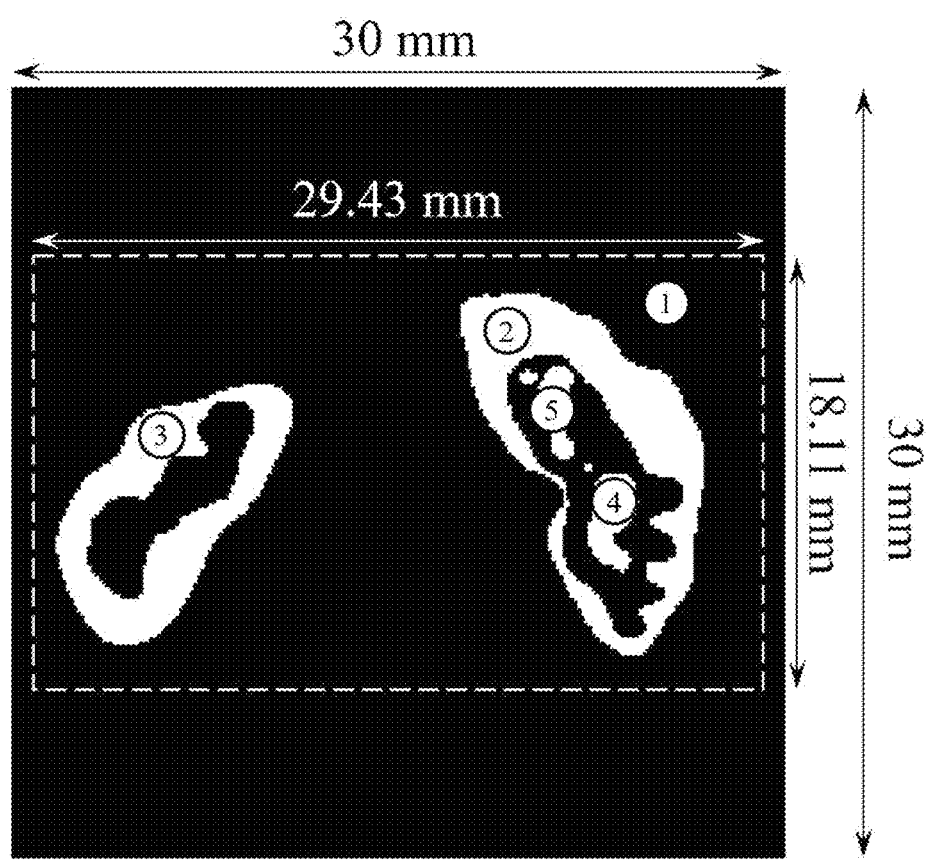

The replicas and the radiation sources used for the simulation for obtaining the alpha ray spectrum are shown in FIGS. 4 and 5, respectively.

A thin phantom in the shape of a kidney with dimensions of 300×300×8 was produced, and the width×length was 29.43×18.11 mm². The thickness of the phantom was 28 μm for all eight slices. The material of the phantom was as shown in FIG. 5. The materials of regions 2 and 3 were a kidney with a density of 1.05, and the materials of regions 4 and 5 were blood vessels or blood with a density of 1.06. The situation where the phantom was placed on an alpha ray imaging device was simulated with the GATE.

In the simulation, $^{225}$Ac and $^{213}$Bi, which are nuclides that emit alpha rays, were injected into regions 1 to 5 as shown in FIG. 5. The situation where both the $^{225}$Ac and the $^{213}$Bi were injected into region 2, only the $^{225}$Ac was injected into regions 3 and 5, and only the $^{213}$Bi was injected into region 4 was simulated. Because the $^{225}$Ac and the $^{213}$Bi, which are in radial equilibrium, were injected considering the Bateman equation, even when only the $^{225}$Ac was injected, daughter nuclides including the $^{213}$Bi were included. Even when only the $^{213}$Bi was injected, daughter nuclides of the $^{213}$Bi were included.

The situation was measured immediately after injection was simulated, and the measurement was made for a total of 150 seconds. Because nuclides on the decay curve of the $^{225}$Ac sometimes emit beta and gamma rays, in order to reduce their influence, only cases with energy over 500 keV were counted (i.e., a threshold set to 500 keV) to obtain an energy spectrum for each pixel. When all the Y values (count values) of the spectrum of one pixel are summed up and expressed as one value, the intensity of the pixel is represented.

Figure 6:
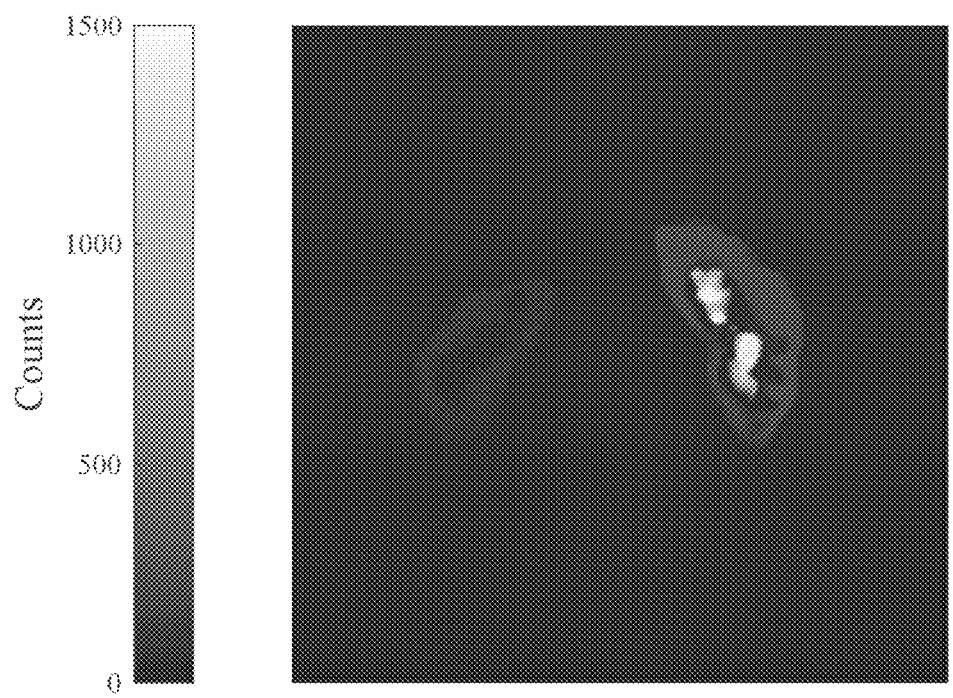
FIG. 6 is a two-dimensional image of the distribution of alpha rays obtained from the experimental example of the present disclosure.

An image was obtained by obtaining the intensity of the pixel in two dimensions. Because the image had dimensions of 300×300 and the area of each pixel was 100 μm², the total size of the image was 30×30 mm². Because the obtained image is a black and white image as shown in FIG. 6, only the radioactivity of each pixel can be known from this image, and information on the distribution of each nuclide cannot be known.

Figure 7:
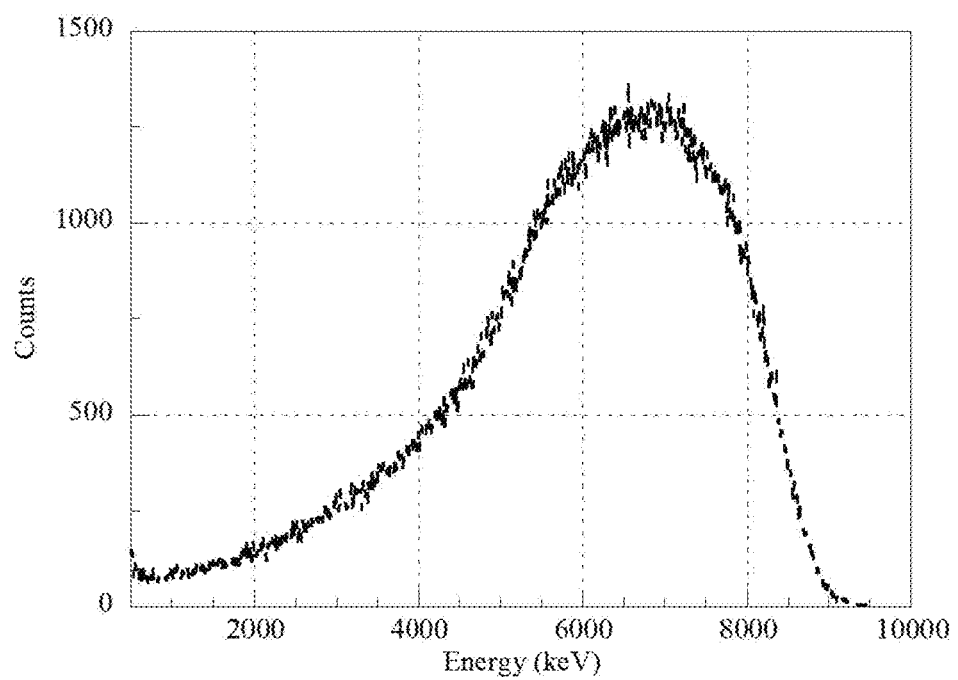
FIG. 7 shows the alpha ray spectrum in region 2 of the experimental example of the present disclosure.
Figure 8A:
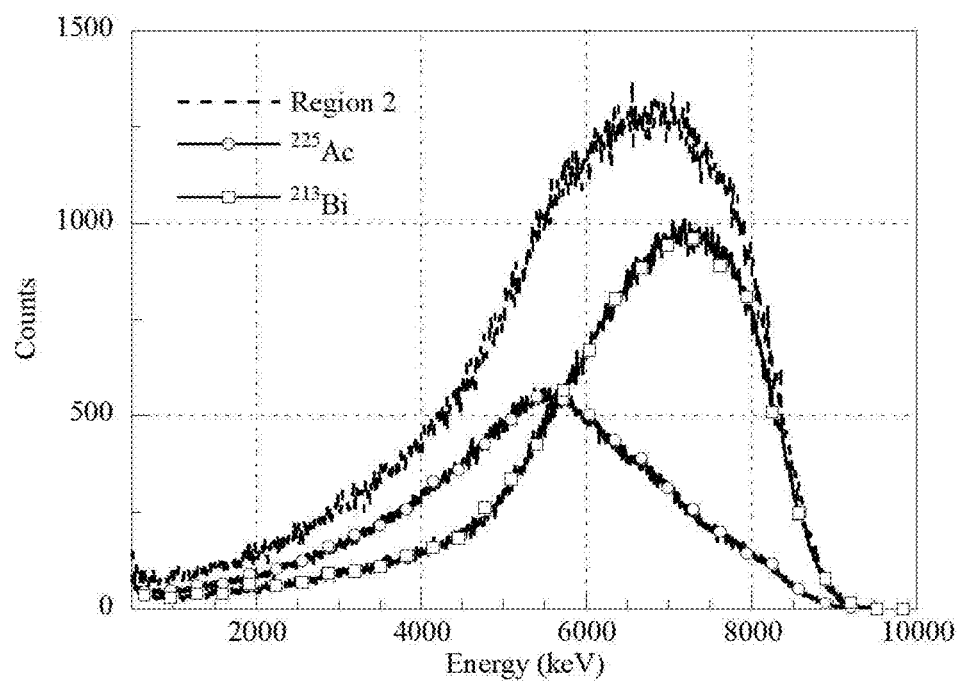
FIGS. 8A to 8D show a first alpha ray spectrum and a second alpha ray spectrum in each region of the experimental example of the present disclosure.
Figure 8B:
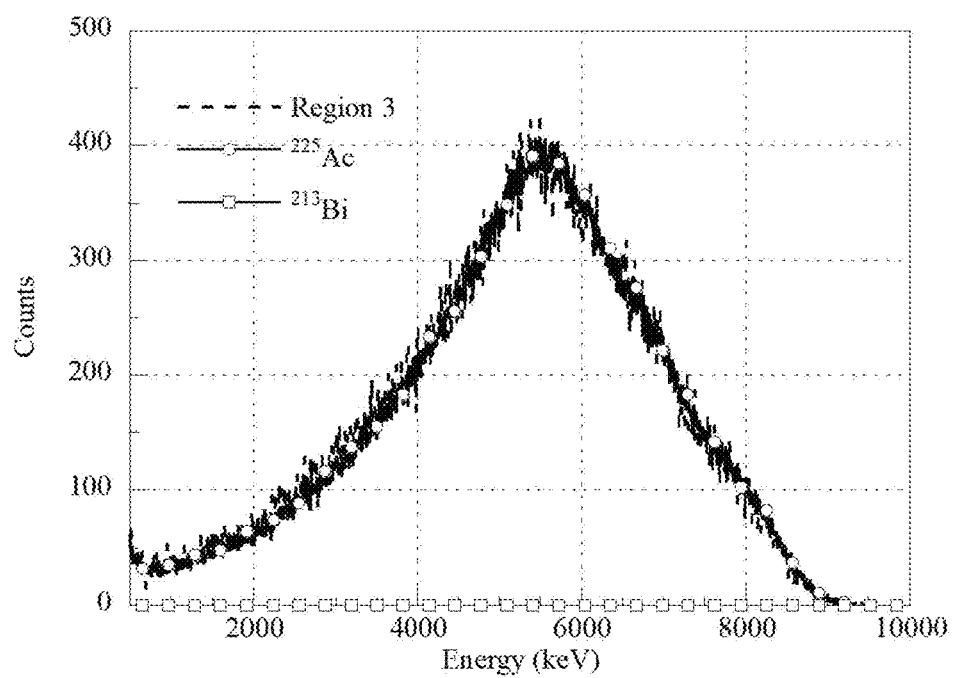
Figure 8C:
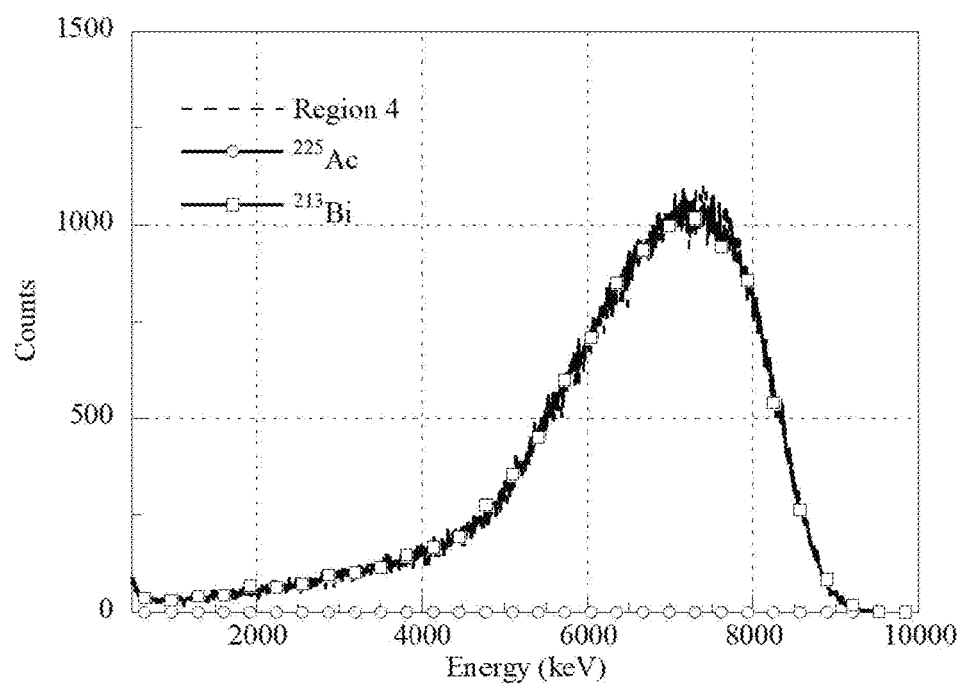
Figure 8D:
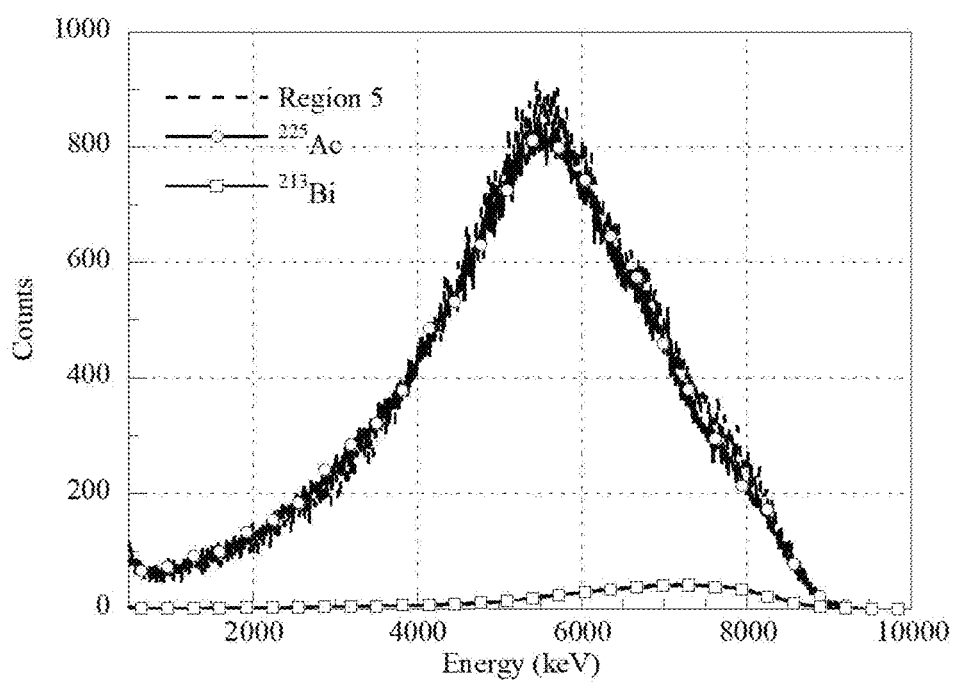

The alpha ray spectrum in region 2 obtained by the above-described process is shown in FIG. 7. FIG. 7 shows "$b_{x,y}$" in Equation 2.

For each region, a first alpha ray spectrum (red color) for a parent nuclide and a second alpha ray spectrum (blue color) for a daughter nuclide that have been obtained by deriving a coefficient according to Equation 2 are shown in FIGS. 8A to 8D.

Here, the parent nuclide refers to the parent nuclide and daughter nuclides generated by the decay of the parent nuclide in a corresponding region, and the daughter nuclide refers to daughter nuclides introduced after being generated in other regions.

Figure 9A:
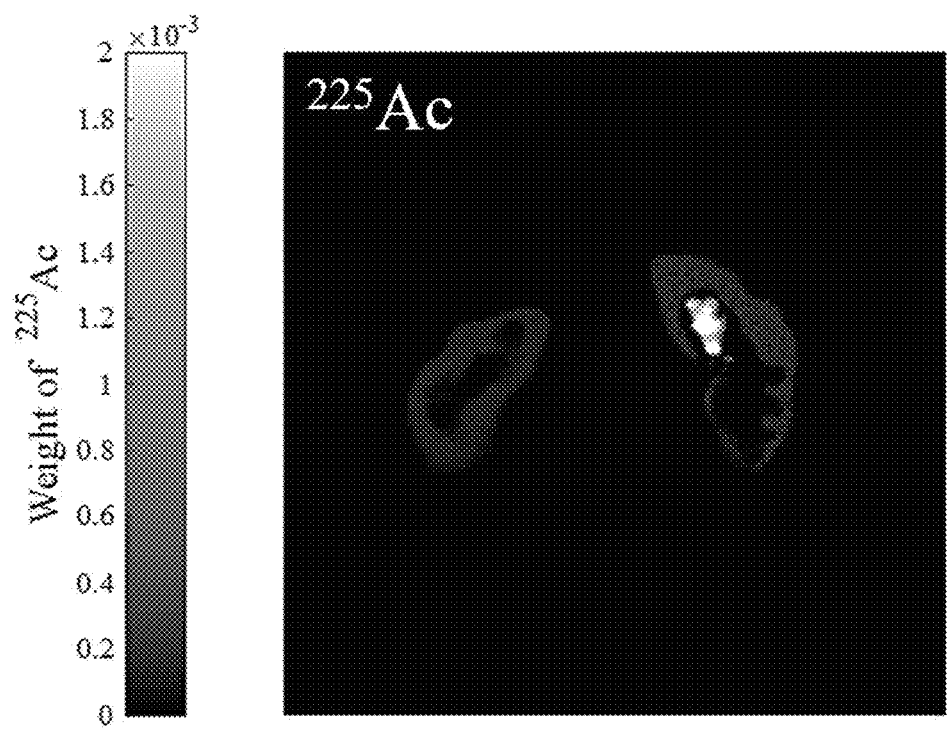
FIGS. 9A and 9B are images of an alpha ray from $^{225}$Ac and an alpha ray from $^{213}$Bi of the experimental example of the present disclosure.
Figure 9B:
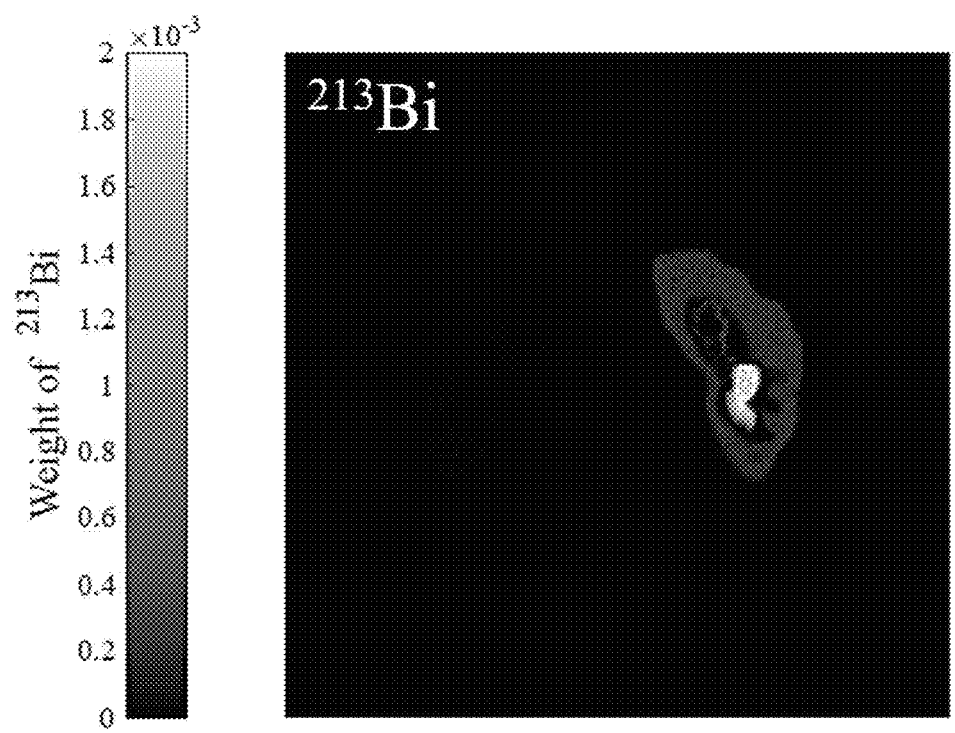

FIGS. 9A and 9B respectively show images of an alpha ray from $^{225}$Ac and an alpha ray from $^{213}$Bi in an experimental example of the present disclosure.

Figure 10:
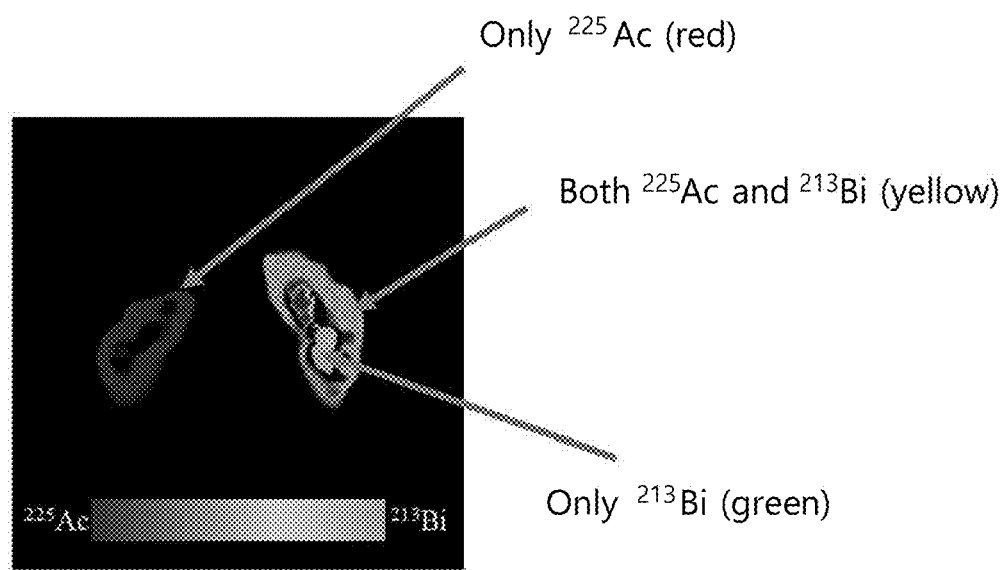
FIG. 10 shows the combination of the image of the alpha ray from $^{225}$Ac and the image of the alpha ray image from $^{213}$Bi of the experimental example of the present disclosure.

An image of a decomposition spectrum for each region obtained by summing up decomposition results for each region is as shown in FIG. 10. The image in FIG. 10 is a color image.

A method of obtaining the image in FIG. 10 is as follows. First, entire two-dimensional images (FIG. 9) of parent and daughter nuclides may be obtained.

The image of the $^{225}$Ac may be converted to an RGB image, and R:G:B=1:0:0 may be applied. A pixel with a high value may be represented by a deep red color, and a pixel with a low value may be represented by a light red color. Similarly, the image of the $^{213}$Bi may be converted to an RGB image, and R:G:B=0:1:0 may be applied. A pixel with a high value may be represented by a dark green color, and a pixel with a low value may be represented by a light green color. When these two images are combined with each other, the area where only the $^{225}$Ac exists may be represented in red, the area where only the $^{213}$Bi exists may be represented in green, and the area where both the $^{225}$Ac and the $^{213}$Bi exist may be represented by a composite value of red and green (e.g., yellow).

Unlike FIG. 6, FIG. 10 shows from which radiation source an alpha ray in a region of interest has been generated.

Referring to FIG. 10, region 2 where both the $^{225}$Ac and the $^{213}$Bi exist is represented in yellow, a mixture of red and green, and it can be confirmed qualitatively that the distribution of an injected radiation source may be well expected.

According to Equation 3 below, the radioactivity of the actually injected nuclide was compared with the radioactivity of the nuclide expected according to the present disclosure.

$$\text{Relative error} = \frac{|\hat{I}_r - I_r|}{I_r} \times 100(\%) \qquad < \text{Equation 3} >$$

$\hat{I}_r$: radioactivity of nuclide expected in region r
$I_r$: radioactivity of actually injected nuclide in region r As a result of the comparison, as shown in FIG. 11, only a relative error of less than 5% was shown for each region.

The above-described embodiments are examples for describing the present disclosure, and the present disclosure is not limited thereto. Since a person having ordinary skills in the technical field to which the present disclosure belongs may be able to carry out the present disclosure with various modifications therefrom, the technical scope of the present disclosure should be defined by the appended claims.

The invention claimed is:

1. A method of analyzing an alpha ray spectrum obtained from a radiation source, wherein the radiation source includes a first nuclide and a second nuclide that are different from each other, comprising:

obtaining simulated spectra of alpha rays emitted from the first and second nuclides by a simulation based on radioactivity functions of the first and second nuclides;

obtaining the alpha ray spectrum by measuring an alpha ray emitted from the radiation source; and decomposing the alpha ray spectrum into a first alpha ray spectrum for an alpha ray emitted from the first nuclide and a second alpha ray spectrum for an alpha ray emitted from the second nuclide based on the simulated spectra.

2. The method of claim 1, wherein the second nuclide is a daughter nuclide of the first nuclide.

3. The method of claim 1, wherein the combination of the first nuclide and the second nuclide is any one of the combinations of [$^{225}$Ac, $^{213}$Bi], [$^{211}$At, $^{212}$Po], [$^{212}$Bi, $^{212}$Po], [$^{213}$Bi, $^{213}$Po], [$^{212}$Pb, $^{212}$Po], [$^{223}$Ra, $^{212}$Bi], and [$^{227}$Th, $^{211}$Bi].

4. The method of claim 2, wherein the radiation source includes a first radiation source and a second radiation source, and the first radiation source and the second radiation source have different distributions of the first nuclide and the second nuclide.

5. The method of claim 4, wherein, in the measurement, the first radiation source and the second radiation source are spaced apart from each other.

6. The method of claim 5, further comprising deriving, after the decomposition, a ratio of an alpha ray from the first radiation source and an alpha ray from the second radiation source at a specific position to be measured.

7. The method of claim 1, wherein the measurement is performed on a replica of a part of the body.

8. The method of claim 1, wherein the radioactivity functions are obtained based on information on the half-life and the probability of emission of the first nuclide and the second nuclide.

9. The method of claim 1, wherein the decomposition of a spectrum to be measured involves a step of obtaining a coefficient ratio between the first alpha ray spectrum and the second alpha ray spectrum at a specific position to be measured.

10. A method of analyzing an alpha ray spectrum obtained from a radiation source, wherein the radiation source includes a first radiation source including a parent nuclide and a second radiation source that is spaced apart from the first radiation source and includes a daughter nuclide of the parent nuclide, comprising:

obtaining simulated spectra of alpha rays emitted from the parent nuclide and the daughter nuclide by a simulation based on radioactivity functions of the parent nuclide and the daughter nuclide;

obtaining the alpha ray spectrum by measuring an alpha ray emitted from the radiation source;

decomposing the alpha ray spectrum into a first alpha ray spectrum for an alpha ray emitted from the parent nuclide and a second alpha ray spectrum for an alpha ray emitted from the daughter nuclide based on the simulated spectra; and classifying alpha rays measured at a specific position into an alpha ray from the parent nuclide and an alpha ray from the daughter nuclide.

11. The method of claim 10, wherein the measurement is performed on a replica of a part of the body.

* * * * *